G. H. & J. H. STROBAND.
PROCESS FOR THE DRYING, HEATING, OR COOLING OF GRAIN, FRUITS, AND OTHER AGRICULTURAL PRODUCTS.
APPLICATION FILED NOV. 10, 1914.
1,146,458.
Patented July 13, 1915.
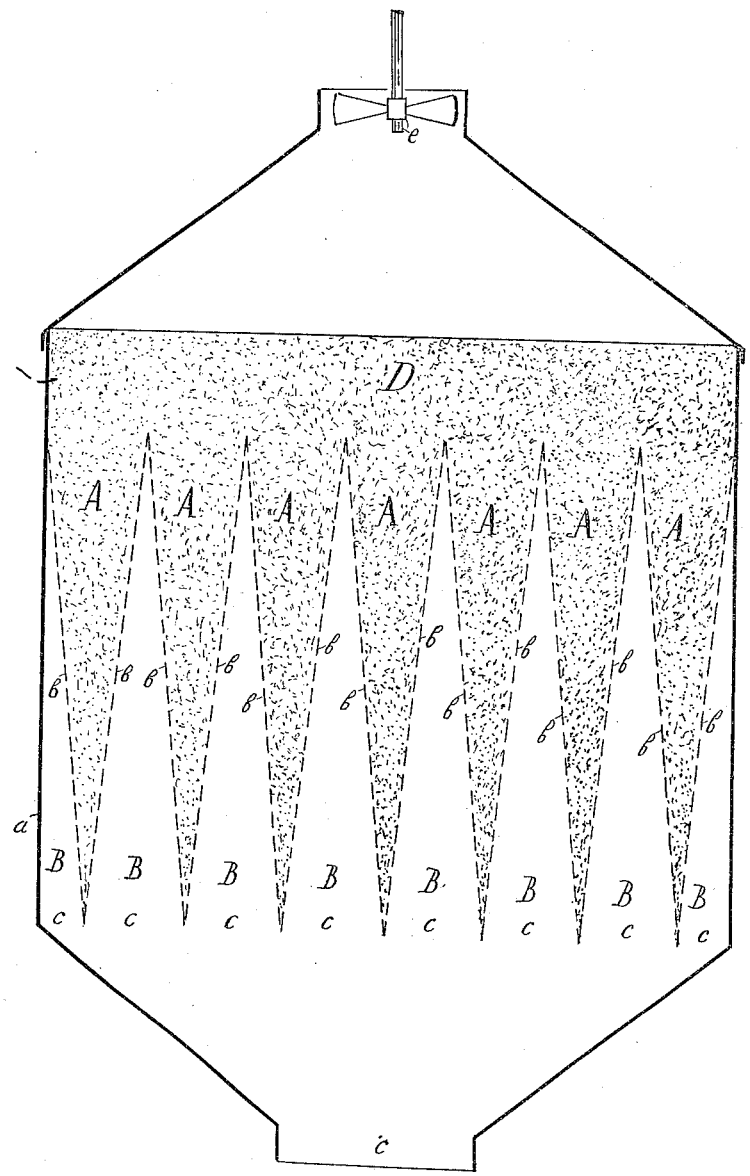
Witnesses
Inventors
G. H. Stroband
J. H. Stroband
By
Atty

UNITED STATES PATENT OFFICE.

GERARDUS HENDRIKUS STROBAND AND JOHANES HENRICUS STROBAND, OF AMSTERDAM, NETHERLANDS.

PROCESS FOR THE DRYING, HEATING, OR COOLING OF GRAIN, FRUITS, AND OTHER AGRICULTURAL PRODUCTS.

1,146,458.      Specification of Letters Patent.      Patented July 13, 1915.

Application filed November 10, 1914. Serial No. 871,417.

*To all whom it may concern:*

Be it known that we, GERARDUS HENDRIKUS STROBAND and JOHANES HENRICUS STROBAND, manufacturers, subjects of the Queen of the Netherlands, both residing at Prinseneiland No. 99, Amsterdam, in the Kingdom of the Netherlands, have invented certain new and useful Improvements in Processes for the Drying, Heating, or Cooling of Grain, Fruits, and other Agricultural Products, of which the following is a full, clear, and exact description.

The subject of the present invention is a process and apparatus for drying, heating or cooling grain, fruits and other agricultural products in order to make the same available for comparatively long storage and transport and in order to free them from harmful moisture.

The feature of the invention is that desiccating air is conducted into gradually increasing masses of the material to be dried, in such a manner that the desiccating stream of air is narrowed or compressed together so that the resulting air resistance (back pressure) is available for drying. The stream of air is therefore caused to act on the material to be dried with a gradually increasing pressure and consequently with increasing intensity corresponding to the gradual increase of the mass of material to be dried.

By this process is obtained the considerable advantage that the volume of air employed for drying is completely utilized when brought into action, and that the escape of considerable volumes of unused air, as is usual in the methods hitherto employed, is avoided. Further, the greater the compression of the volume of air brought into action and the greater the consequent air resistance corresponding to the gradual increase of the masses to be dried, the greater is its desiccating effect. According to this process the desiccating air always passes first through thin layers of the material to be dried and gradually penetrates into gradually increasing masses. For working this process the desiccating air is conducted through housings or spaces which are divided by suitable means, such as for example wire partitions and the like, into compartments of wedge, prism or other shape. These compartments are filled with the material to be dried in such a manner that between each two neighboring prisms filled with material to be dried there remains an empty prism permeated by air, through which the desiccating air passes with a gradual constriction to the prisms containing the material to be dried and permeates the same.

Any suitable medium may be employed for drying other than air. Preferably air is used which has previously been freed from atmospheric moisture in any convenient manner, for example by treatment with suitable chemical materials such as calcium chlorid; but heated or cooled air or a stream of vapor may also be employed. The present invention is described by way of example for the case in which a stream of air is employed as the drying medium.

In the accompanying drawing the subject of the invention is illustrated diagrammatically.

$a$ is the housing or internal space in which are provided partition walls $b$, $b$ which together form suitable prismatic spaces A, B. The admission of the desiccating air takes place at $c$, $c$.

Some of the above mentioned spaces A, B, which enlarge in the direction of the entering stream of air, are filled with the material to be dried, while the prisms B, B which have their broad ends turned toward the stream of air serve for the inlet of the desiccating stream of air. As is shown in the drawing the arrangement may also be such that, at the place where the broad ends of the prisms filled with the material to be dried are situated, there is formed a space $d$ taking up the whole width of the drying apparatus, which space is likewise filled with material to be dried, the stream of air which permeates the wedge-shaped prisms A, A impinging on the mass in this space and passing through the same.

The practical advantage of an apparatus of this kind consists in the fact that the mass of material to be dried per unit of time is many times as great as can be dried by means of the usual rotary drying drums. Observation has shown a tenfold drying effect with this process and this apparatus, that is to say a tenfold greater mass of material to be dried can be dealt with as compared with the methods hitherto used.

The ordinary rotary drying drums can only operate upon material to be dried to the extent of one fifteenth of the drum capacity while apparatus constructed according to the present invention can treat a quantity of material equal to two-thirds of the cubic capacity of the apparatus.

A further advantage of this invention consists in the fact that the whole volume of the desiccating air must act on the material to be dried, because it is compelled to pass through the same before it leaves the apparatus.

In the drying processes and drying apparatus hitherto used and especially in drying drums, the greater portion of the desiccating air flows through without being utilized. It is of importance to prevent such waste because in certain processes the desiccating air itself must be previously treated by heating or other expensive means before it can be brought into action. Further a very thorough drying is effected by this method because the contact surface between the material to be dried and the desiccating air is considerably enlarged by the prismatic formation of the interior of the apparatus. An increased efficiency for practical requirements is guaranteed by these advantages.

What we claim is:

The combination with a casing provided with an inlet opening at its lower end and an outlet opening at its upper end, of a foraminous partition extending across said casing and forming a plurality of acutely wedge-shaped bags extending for the greater part of the height of the casing body and adapted to receive material to be dried, said bags having between them acutely wedge-shaped upwardly extending air spaces opening toward the inlet.

In witness whereof, we subscribe our signatures in presence of two witnesses.

GERARDUS HENDRIKUS STROBAND.
JOHANES HENRICUS STROBAND.

Witnesses:
F. W. HULSHOFF,
M. R. ATKINSON.

Copies of this patent may be obtained for five cents each, by addressing the "Commissioner of Patents, Washington, D. C."